United States Patent
Muchherla et al.

(10) Patent No.: US 12,326,782 B2
(45) Date of Patent: *Jun. 10, 2025

(54) ADJUSTMENT OF CODE RATE AS FUNCTION OF MEMORY ENDURANCE STATE METRIC

(71) Applicant: MICRON TECHNOLOGY, INC., Boise, ID (US)

(72) Inventors: Kishore Kumar Muchherla, San Jose, CA (US); Niccolo' Righetti, Boise, ID (US); Sivagnanam Parthasarathy, Carlsbad, CA (US); Mustafa N. Kaynak, San Diego, CA (US); Mark A. Helm, Santa Cruz, CA (US); James Fitzpatrick, Laguna Niguel, CA (US); Ugo Russo, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/611,450

(22) Filed: Mar. 20, 2024

(65) Prior Publication Data

US 2024/0232013 A1 Jul. 11, 2024

Related U.S. Application Data

(63) Continuation of application No. 17/897,869, filed on Aug. 29, 2022, now Pat. No. 11,983,067.

(51) Int. Cl.
| | | |
|---|---|---|
| G06F 11/10 | (2006.01) | |
| G06F 11/07 | (2006.01) | |
| G06F 11/14 | (2006.01) | |
| G06F 11/30 | (2006.01) | |
| G06F 13/16 | (2006.01) | |
| G06F 13/28 | (2006.01) | |
| H03M 13/11 | (2006.01) | |
| H03M 13/15 | (2006.01) | |

(52) U.S. Cl.
CPC ........ G06F 11/1068 (2013.01); G06F 11/076 (2013.01); G06F 11/1435 (2013.01)

(58) Field of Classification Search
CPC .......................... G06F 11/1435; G06F 11/076
See application file for complete search history.

(56) References Cited

U.S. PATENT DOCUMENTS

| | | | |
|---|---|---|---|
| 9,489,148 B2 | 11/2016 | Goss et al. | |
| 10,996,863 B1 | 5/2021 | Kuzmin et al. | |
| 11,061,768 B1 | 7/2021 | Alrod et al. | |
| 11,132,244 B2 * | 9/2021 | Tanakamaru | G06F 13/1668 |
| 11,983,067 B2 * | 5/2024 | Muchherla | G06F 11/1435 |

(Continued)

*Primary Examiner* — Guy J Lamarre
(74) *Attorney, Agent, or Firm* — LOWENSTEIN SANDLER LLP

(57) ABSTRACT

A method includes determining, by a processing device, a value of a memory endurance state metric associated with a segment of a memory device in a memory sub-system; determining a target value of a code rate based on the value of the memory endurance state metric, and adjusting the code rate of the memory device according to the target value, wherein the code rate reflects a ratio of a number of memory units designated for storing host-originated data to a total number of memory units designated for storing the host-originated data and error correction metadata.

20 Claims, 7 Drawing Sheets

(56) References Cited

U.S. PATENT DOCUMENTS

| | | |
|---|---|---|
| 2015/0106557 A1 | 4/2015 | Yu et al. |
| 2016/0062679 A1 | 3/2016 | Samuels et al. |
| 2018/0373428 A1 | 12/2018 | Kan et al. |
| 2020/0019459 A1 | 1/2020 | Cadloni et al. |
| 2020/0066364 A1 | 2/2020 | Liikanen |
| 2021/0232323 A1 | 7/2021 | Kannan et al. |
| 2023/0208448 A1 | 6/2023 | Avraham et al. |

* cited by examiner

| P/E cycle range | Code rate |
|---|---|
| 0-V | 0.9 |
| V-W | 0.8 |
| W-X | 0.7 |
| X-Y | 0.6 |
| Y-Z | 0.5 |

ADJUSTMENT OF CODE RATE AS FUNCTION OF MEMORY ENDURANCE STATE METRIC

RELATED APPLICATIONS

This application is a continuation application of co-pending U.S. patent application Ser. No. 17/897,869, filed Aug. 29, 2022, which is incorporated herein by reference.

TECHNICAL FIELD

Embodiments of the disclosure relate generally to memory sub-systems, and more specifically, relate to adjustment of code rate as function of memory endurance state metric.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various implementations of the disclosure.

DETAILED DESCRIPTION

Figure 1:
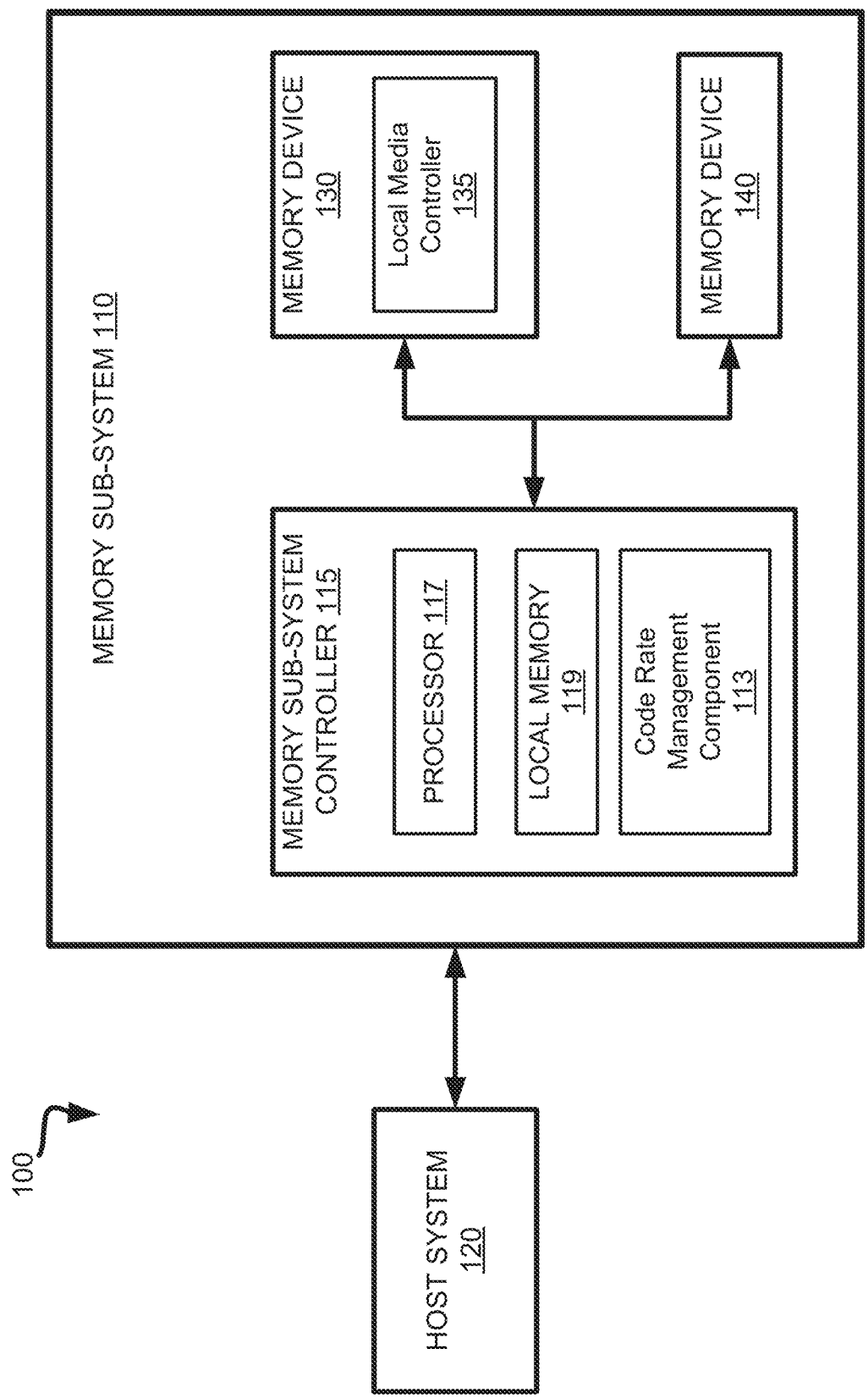
FIG. 1 illustrates an example computing environment that includes a memory sub-system in accordance with some embodiments of the present disclosure.

Aspects of the present disclosure are directed to adjusting code rate based on memory endurance state metric. A memory sub-system can be a storage device, a memory module, or a hybrid of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

A memory sub-system can include high density non-volatile memory devices where retention of data is desired when no power is supplied to the memory device. For example, NAND memory, such as 3D flash NAND memory, offers storage in the form of compact, high density configurations. A non-volatile memory device is a package of one or more dice, each including one or more planes. For some types of non-volatile memory devices (e.g., NAND memory), each plane includes of a set of physical blocks. Each block includes of a set of pages. Each page includes of a set of memory cells ("cells"). A cell is an electronic circuit that stores information. A block hereinafter refers to a unit of the memory device used to store data and can include a set of memory cells addressable by one or more wordlines. Each block can include a number of sub-blocks, where each sub-block is defined by an associated pillar (e.g., a vertical conductive trace) extending from a shared bitline. A block can include a predefined number of pages.

Over-provisioning refers to keeping above one the ratio of the physical capacity of a memory device and the logical capacity presented through the operating system as available to a host system. The physical density of a memory device can be determined by blocks (e.g., minimum number) that accommodate the rated memory sub-system capacity (e.g., drive capacity) and the over-provisioning blocks that accommodate the endurance requirements (e.g., total bytes written (TBW)). For example, if a memory sub-system has 30 Gigabyte (GB) rated capacity and requires 150 Petabyte (PB) TBW requirement, the program erase (P/E) cycles needs to reach 5 million. To reduce the P/E cycles requirement but still keep the capacity and the endurance of the system, 270 GB of blocks for over-provisioning may be added to the system so that P/E cycles requirement can be reduced to 500,000. However, customers purchasing the system are charged for the system capacity (e.g., 30 GB), and the over-provisioning blocks (e.g., 270 GB) would not be cost-efficient for manufacturers.

Aspects of the present disclosure address the above and other deficiencies by adjusting code rate based on a chosen memory endurance state metric. Specifically, the memory endurance can reflect an expected useful life of a management unit (e.g., a block), and the value of an endurance state metric can indicate where in the spectrum of endurance (e.g., new, near retirement, time to retire) the unit of memory currently operates. Various memory endurance state metrics can be used to reflect the memory endurance state, including count of program erase cycles (P/E cycles), total bytes written, error connection related parameter (e.g., a raw bit error rate (RBER)). A program erase cycle can refer to one or more operations (e.g., program or erase operation) in which data is written to the memory component and subsequently erased. Total bytes written can refer to bytes written as host data accumulated through the life (including every program erase cycle) of the memory component. RBER can refer to a ratio of the number of bit errors to the number of all data bits stored at the data block. The memory sub-system controller can determine a value of a chosen memory endurance state metric of a memory device and use the memory endurance state metric to determine a target value for adjusting the code rate.

Determining a target value of a code rate may involve accessing a data structure stored in the metadata area of the memory device to obtain a target value. In some implementations, the data structure can be represented by a look-up table, which provides the target value of a code rate based on the value of the memory endurance state metric. The look-up table can be characterized during manufacturing the memory device. In some implementations, sample data associated with one specific memory unit (e.g. block) of the memory device can be used to make the determination of the target value of a code rate based on the value of the memory endurance state metric. The specific memory unit (e.g. block) can be randomly chosen from the memory unit (e.g. blocks) of the memory device and then sacrificed for testing by accelerating collection of data to provide the code rate as a function of the memory endurance state metric.

Once the target value is determined, the memory sub-system can adjust the code rate according to the target value. The code rate reflects the ratio of the host-originated data ("user data") to a combination of the user data and the error correction metadata ("error correction data"). For example, the code rate can be the ratio of the amount of user data to the total amount of the user data and the error correction data. In other examples, the code rate can be the ratio of the amount of bits designated for the user data and the total amount of bits designated for the user data and the error correction data. The amount of bits can result in different numbers of memory cells based on the type of memory cells, such as SLCs, MLCs, TLCs, QLCs, PLCs, and the aspects of the present disclosure applies to various types of memory cells. Thus, the code rate can be the ratio of the number of memory units (e.g., cells) designated for the user data and the total the number of memory units designated for the user data and the error correction data. In other examples, if each block is used exclusively for user data or exclusively for error correction data, the code rate can be the ratio of the number of blocks designated for user data to the total number of blocks designated for user data and the error correction data. The term "reflects" may cover any derivative of the reflected item, for example, the reflecting item (e.g., the code rate) is derived from the reflected item (e.g., the ratio of user data to a combination of the user data and error correction data) by applying a known mathematical transformation to the reflected item, which can be a linear function, a non-linear function, an aggregate function, etc. Accordingly, adjusting the code rate may involve adjusting the number of memory units designated for storing host data and the number of memory units designated for storing error correction data, or designating or undesignating additional memory units (e.g., blocks) for error correction data.

For example, a memory device can maintain a counter of P/E cycles, and when the counter indicates the memory device (or blocks) has long unconsumed useful life (e.g., the memory device is at the beginning of life), the memory sub-system can access to the data structure to determine the target value of the code rate to be a value higher than a default value of a code rate, based on the count value of the P/E cycles. To make the code rate accord to the target value, the memory sub-system can adjust the code rate of the memory device by adjusting the amount of data designated for host data and the amount of data designated for error correction data. Alternatively, the memory sub-system can adjust the code rate of the memory device by re-purposing bits used for error correction data so that these bits can be used for other purposes including for host data.

As another example, a memory device can maintain a counter of P/E cycles, and when the counter indicates the memory device (or blocks) has short unconsumed useful life (e.g., the memory device is at the end of life), and the memory sub-system can then access to the data structure to determine a target value of a code rate to be a value lower than a default value of a code rate, based on the count value of the P/E cycles. To make the code rate accord to the target value, the memory sub-system can adjust the code rate of the memory device by adjusting the amount of data designated for host data and the amount of data designated for error correction data. Alternatively, the memory sub-system can adjust the code rate of the memory device by designating additional blocks for error correction data.

Although the count of P/E cycles is used as examples of the memory endurance state metric, other memory endurance state metrics can be used instead of or in addition to the count of P/E cycles including, for example, total bytes written, the raw bit error rate, etc. In some implementations, the memory sub-system can use various criteria to determine whether to perform the code rate adjustment. An example criterion can test the end-of-life of the memory device. In some implementations, the memory sub-system can determine to perform the code rate adjustment at a preset interval. In some implementations, the memory sub-system can determine to perform the code rate adjustment responsive to detecting a workload or environment change satisfying a threshold. In some implementations, the memory sub-system can determine to perform the code rate adjustment responsive to detecting an event occurs, for example, a new block is allocated for host data. In some implementations, the memory sub-system can determine to perform the code rate adjustment responsive to detecting a change of the value of the memory endurance state metric satisfying a threshold.

Advantages of the present disclosure include increasing the memory endurance by adjusting the code rate based on evaluating a chosen memory endurance state metric. Specifically, when a memory device is at the beginning of life (e.g., the count value of P/E cycles is smaller than a threshold value), it has abundant health memory margins, and the error correction (e.g., error-correcting code (ECC)) capability offered by a default code rate exceeds necessity for the memory margins. As such, by increasing the code rate (e.g., reducing the error correction capability) at the beginning of life of the memory device, the systems and methods of the present disclosure provides additional capacity for the host data at the beginning of life of the memory device, while satisfying the error correction requirements. On the other hand, when a memory device is approaching the end of life, the error correction capability offered by a default code rate may be insufficient. At that time, the need for over-provisioning yields to the error correction requirements. As such, by decreasing the code rate (and thus increasing the error correction capability) towards the end of life of the memory device, the present disclosure extends the life of memory device by improving the error correction capability to create more P/E cycles. This would increase the TBW of the memory device because even though the user data written per P/E cycle may decrease, the bytes written with the extended P/E cycles would result in increased TBW. Aspects of the present disclosure change the code rates adaptively through the lifetime of a memory device to achieve an overall increased TBW for a given drive capacity. In addition, the present disclosure can reduce the P/E cycle requirement for given drive capacity of a specific memory device because the bytes written per P/E cycle at the beginning of life of the memory device is increased, resulting in the decreased number requirement of P/E cycle to reach a certain TBW. Therefore, for a system with a specific capacity, the endurance of the system is enhanced by reducing or without having a disproportional amount of blocks for over-provisioning.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access the memory devices (e.g., memory devices 130) when the memory sub-system 110 is coupled with the host system 120 by the PCIe interface. The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include negative-and (NAND) type flash memory and write-in-place memory, such as three-dimensional cross-point ("3D cross-point") memory. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLCs) can store one bit per cell. Other types of memory cells, such as multi-level cells (MLCs), triple level cells (TLCs), quad-level (QLCs), and penta-level cells (PLCs) cells, can store multiple bits per cell. In some embodiments, each of the memory devices 130 can include one or more arrays of memory cells such as SLCs, MLCs, TLCs, QLCs, PLCs or any combination of such. In some embodiments, a particular memory device can include an SLC portion, and an MLC portion, a TLC portion, a QLC portion and a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory devices such as a 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor 117 (e.g., a processing device) configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

A portion of the memory device 130 and/or 140 can be reserved for an SLC cache. SLC caching stores incoming host data in SLC memory cells prior to being written to higher density memory cell (e.g., MLC, TLC, QLC, etc.). Data caching is performed to avoid loss of data and/or to minimize an amount of time for data received from the host system 120 to be programmed to memory device 130 and/or 140. For example, the memory sub-system 110 can receive host data to be stored in MLC memory cells, and initially stores the host data in SLC memory cells, which have a faster write time. The memory sub-system 110 then copies the host data from the SLC memory cells to MLC memory cells. The potential loss of data resulting from power loss during the write operation to the MLC memory cells is avoided because all of the data stored in the SLC memory cells can be retrieved after power is restored. Once data is transferred from a block of the SLC cache to a higher density memory cell, the block can be invalidated, and a garbage collection operation can be performed to erase the data on the block, thereby allowing the block to be programmed with new data.

The memory sub-system 110 includes a code rate management component 113 that can determine a value of a memory endurance state metric on a memory device (or one or more blocks of a memory device) in a memory sub-system, determine a target value of a code rate based on the value of a memory endurance state metric, wherein the code rate reflects a ratio of an amount of data designated for host data to a total amount of data designated for the host data and error correction data, and adjust the code rate of the memory device (or one or more blocks of the memory device) based on the target value of the code rate. The memory endurance state metric may comprise a count of program erase cycles. Adjusting the code rate can involve increasing the code rate or decreasing the code rate.

To increase the code rate, the code rate management component 113 can designate an increased portion of the memory device (or one or more blocks of the memory device) to store the host data and a decreased portion of the memory device (or one or more blocks of the memory device) to store the error correction data to increase the code rate. Alternatively, the code rate management component 113 can designate the additional block(s) of the memory device to store the error correction data in order to decrease the code rate.

To decrease the code rate, the code rate management component 113 can designate a decreased portion of the memory device (or one or more blocks of the memory device) to store the host data and an increased portion of the memory device (or one or more blocks of the memory device) to store the error correction data. Alternatively, the code rate management component 113 can undesignate the block(s) previously designated for storing the error correction data to store other data in order to increase the code rate.

FIGS. 2-5 are flow diagrams of example methods to adjust a code rate based on a memory endurance metric, in accordance with some embodiments of the present disclosure. The methods 200-500 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the methods 200-500 are performed by the code rate management component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

The methods 200-500 are described using blocks. It is noted that blocks are used by way of example, and that any management unit can be used in place of the blocks, such as pages, superblocks, sub-blocks, half-blocks, etc. A half-block can include half of the memory pages of a block. A sub-block can include any portion of memory pages of a block. In some implementations, the code rate may be calculated, determined, or adjusted specific to the whole memory device. In some implementations, the term "segment" may be used to indicate that a code rate is calculated, determined, or adjusted specific to the part of the memory device. It is also noted that blocks that are used for adjusting the code rate are used by way of example, and that any memory unit can be used in place of the blocks.

Figure 2:
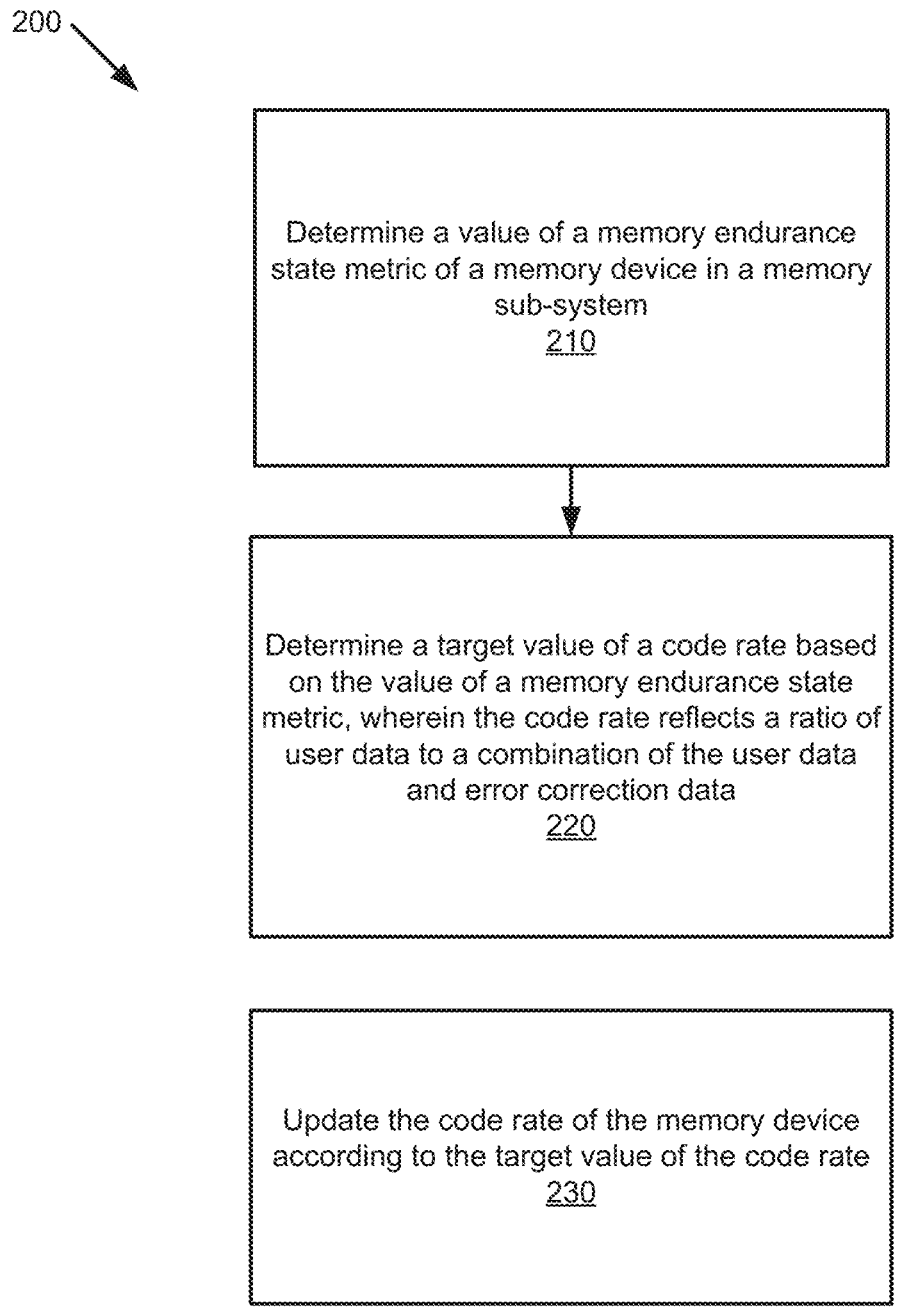
FIGS. 2-5 are flow diagrams of example methods to adjust a code rate based on a memory endurance state metric in accordance with some embodiments of the present disclosure.

Referring to FIG. 2, at operation 210, the processing logic determines a value of a memory endurance state metric on one or more management units of a memory device in a memory sub-system. Various metrics can be used to indicate the endurance state, including a count of program erase cycles, total bytes written, or an error connection related parameter (e.g., a raw bit error rate (RBER)).

In some implementations, the processing logic may maintain counters of the program erase cycles associated with respective management units. In some implementations, the processing logic may maintain a counter of total bytes written (TBW) associated with respective management units. In some implementations, the processing logic may determine a value of the raw bit error rate (RBER) associated with respective management units. The memory endurance state metric may be represented by any value, including its respective unit value, or a percentage value.

In some implementations, the processing logic may determine whether to adjust the code rate. For example, the processing logic may determine to adjust the code rate every pre-defined interval. In another example, the processing logic may determine to perform the code rate adjustment when a change to workload or environment over a threshold is detected. In another example, the processing logic may determine whether to perform the code rate adjustment by determining whether the memory endurance state metric satisfies a threshold criterion. For example, the processing logic may compare the memory endurance state metric with the threshold criterion. The threshold criterion can represent a system requirement for a minimum amount of valid blocks required to accommodate certain logical capacity at the end of life, at early stages of life, or at middle stages of life. In some implementations, the threshold criterion may include a value, and the processing logic may determine that the memory endurance state metric satisfies the threshold criterion when the value of the memory endurance state metric exceeds or meets the value of the threshold criterion. In some implementations, the threshold criterion may be a range of values, and the processing logic may determine that the memory endurance state metric satisfies the threshold criterion when the value of the memory endurance state metric falls in the range of values of the threshold criterion. Other criteria are described with respect to FIGS. 3-5.

Figures 6A, 6B:
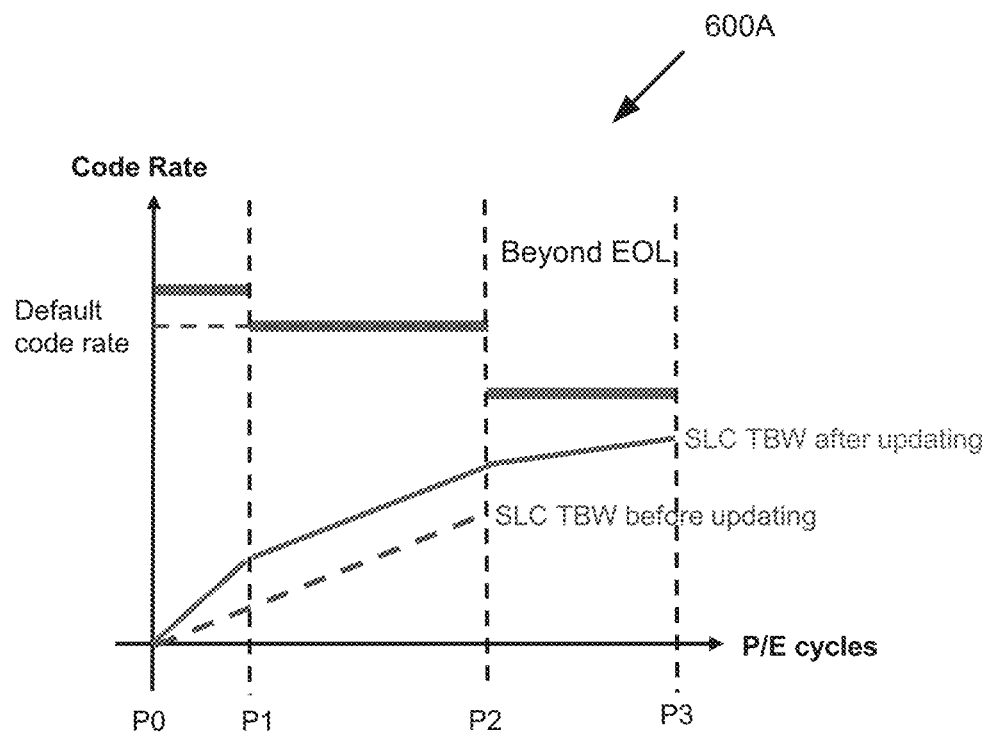
FIGS. 6A and 6B are example illustrations of adjusting a code rate based on memory endurance state metric in accordance with some embodiments of present disclosure.

At operation 220, the processing logic determines a target value of the code rate based on the value of the memory endurance state metric. The determination of the code rate can be based on the value of the memory endurance state metric. The code rate can be a function of the memory endurance state metric. For example, the function may be a linear relationship between code rate and memory endurance state metric. In another example, the function may be a multi-range relationship between code rate and memory endurance state metric (e.g., as shown in FIGS. 6A-6B).

In some implementations, a look-up table may be provided including the memory endurance state metric and the corresponding code rate, and the processing logic determine the value of the code rate through the look-up table. The look-up table may be pre-characterized before use by the customer. In one example, the look-up table may provide a value of the memory endurance state metric corresponding to a value of the code rate, for example, 50% memory endurance state metric corresponding to 0.85 code rate. In another example, the look-up table may provide a range of the memory endurance state metric (i.e., any value falls within the range) corresponding to a value of the code rate, for example, 40%-60% memory endurance state metric corresponding to 0.85 code rate, in which case that when the value of the memory endurance state metric falls in 40%-60%, the code rate can be adjusted to 0.85. In another example, the look-up table may provide a value of the memory endurance state metric corresponding to a range of the code rate (i.e., any value falls within the range), for example, 50% memory endurance state metric corresponding to 0.84-0.86 code rate, in which case that when the value of the memory endurance state metric is 50%, the code rate can be adjusted to any value that falls within 0.84-0.86. In another example, the look-up table may provide a range of the memory endurance state metric corresponding to a range of the code rate, for example, 40%-60% memory endurance state metric corresponding to 0.84-0.86 code rate, in which case that when the memory endurance state metric falls in 40%-60%, the code rate can be adjusted to any value that falls within 0.84-0.86. It is noted although the memory endurance state metric are illustrated as percentage values, the unit or value used for representing the memory endurance state metric can vary.

In some implementations, sample data may be provided including the memory endurance state metric and the corresponding code rate, and the processing logic determines the value of the code rate through the sample data. The sample data may be obtained on-the-fly. That is, when a memory device is in use, the sample data can be collected based on the real-time data. For example, a block (or any segment of the memory component) of the memory device may be designated as a sacrificial block used for characterizing the sample data. The sacrificial block may be used to write dummy data in order to collect information that can be used as sample data, and the processing logic may obtain the sample data of the sacrificial block. In one example, a sacrificial block is allocated for every N blocks used for host data, where N is a predefined number. As the host data blocks are written with host data during one P/E cycle, the sacrificial block is written with dummy data that is larger than (e.g., 1.5 times of) the host data for one P/E cycle. Therefore, the sacrificial block accumulates P/E cycles at a larger rate than the blocks used for host data. Based on the performance of the sacrificial block corresponding to the P/E cycles, the sacrificial block can provide sample data including the memory endurance state metric and the corresponding code rate. For example, for one P/E cycle performed on N blocks of user data, one sacrificial block can be subjected to multiple P/E cycles. In one example illustrated here, while 100 blocks are written at 1 GB/sec with host data, one sacrificial block is written at 100 MB/sec with dummy data. As a result, the sacrificial block accumulates P/E cycles ten times than user data block. Thus, the sacrificial block provides look-ahead data that shows how user data blocks will be worn out on future P/E cycles and how much error correction capability is necessary to meet the customer's need of using this memory device. Therefore, the sacrificial block will provide, in real time, look-ahead wear rate and the error correction capability necessary at different P/E cycles.

At operation 230, the processing logic may adjust (e.g., increase or decrease) the code rate associated with the block(s) of the memory device according to the target value of the code rated determined at operation 220, wherein the code rate represents the ratio of the host data to a combination of the host data and the error correction data. In some implementations, the code rate may be determined at full drive capacity and have a default value. In one example, the processing logic can set the code rate as a fixed value during manufacturing, testing, or calibration of the memory-sub-system 110 (e.g., prior to shipment to an end user), and then the processing logic can dynamically change or update the code rate during the lifetime of the memory sub-system 110. In another example, the code rate can be updated by the host system 120. For example, the controller 115 can receive commands from the host system 120 indicating one or more of an updated code rate.

In some implementations, adjusting the code rate can include increasing or decreasing the code rate, or restoring the default value of the code rate. In some implementations, the processing logic may set the code rate to its maximum allowable value upon the first boot of the memory device, and then decrease the code rate through the life of the memory device.

In some implementations, the processing logic may increase or decrease the code rate by keeping the total number of the block(s) but designating different numbers of blocks used for host data and error correction data. In one implementation, the processing logic may decrease the code rate by decreasing the number of blocks used for host data and increasing the number of blocks used for error correction data. For example, a memory device (or any segment of the memory device) includes ten blocks, nine blocks of the memory device is used for storing host data, and one block of the memory device is used for ECC, then the code rate for the memory device has a value of 0.9 (e.g., a ratio of nine blocks (i.e., host data blocks) to a combination of nine blocks (i.e., host data blocks) and one block (i.e., ECC block)); then one block is re-purposed from storing host data to storing ECC data, which leads to the code rate reduced to a value of 8/10=0.8 (e.g., a ratio of eight blocks (i.e., host data blocks) to a combination of eight blocks (i.e., host data blocks) and two blocks (i.e., ECC blocks)).

In another implementation, the processing logic may increase the code rate by increasing the number of blocks used for host data and decreasing the number of blocks used for error correction data. For example, a memory device (or any segment of the memory device) includes ten blocks, seven blocks of the memory device is used for storing host data, and three blocks of the memory device is used for ECC, then the code rate for the memory device has a value of 0.7 (e.g., a ratio of seven blocks (i.e., host data blocks) to a combination of seven blocks (i.e., host data blocks) and three blocks (i.e., ECC block)); then one block is changed from for use as ECC data to host data, which leads to the code rate increased to a value of 8/10=0.8 (e.g., a ratio of eight blocks (i.e., host data blocks) to a combination of eight blocks (i.e., host data blocks) and two blocks (i.e., ECC blocks)).

In some implementations, the processing logic may increase or decrease the code rate by keeping the number of the block(s) used for host data but adding or deleting the block(s) used for error correction data. In one implementation, the processing logic may decrease the code rate by adding extra block(s) designated for ECC usage, that is, designating these blocks for extra ECC use. For example, a memory device (or any segment of the memory device) includes ten blocks, nine blocks of the memory device is used for storing host data, and one block of the memory device is used for ECC, then the code rate for the memory device has a value of 0.9 (e.g., a ratio of nine blocks (i.e., host data blocks) to a combination of nine blocks (i.e., host data blocks) and one block (i.e., ECC block)); then one extra block is added for use as ECC, which leads to the code rate reduced to a value of 9/11=0.82 (e.g., a ratio of nine blocks (i.e., host data blocks) to a combination of nine blocks (i.e., host data blocks) and two blocks (i.e., ECC blocks)). In some implementations, the extra block(s) designated for ECC usage can be marked as a separate layer that distinguishes from the block used as ECC by default. In some implementations, a separate layer that includes all extra block(s) designated for ECC usage can be used for distinguishing from a layer that includes all block(s) used as ECC by default.

In another implementation, the processing logic may increase the code rate by deleting all or some of the blocks designated for ECC usage, that is, freeing these blocks for other tasks or purposes. In some implementations, the processing logic may increase the code rate by un-designating ECC block(s) so that these blocks will not be used for ECC purpose. In some implementations, the processing logic may increase the code rate by un-designating some extra ECC block(s) in the separate layer so that these blocks will not be used for extra ECC purpose. In some implementations, increasing the code rate may put the code rate back into its default value. For example, a memory device (or any segment of the memory device) includes ten blocks, nine blocks of the memory device is used for storing host data, one block of the memory device is used for ECC, and one extra block has been added for use as ECC, and then the extra block is deleted or un-designated, which leads to the code rate reduced from a value of 9/11=0.82 (e.g., a ratio of nine blocks (i.e., host data blocks) to a combination of nine blocks (i.e., host data blocks) and two blocks (i.e., ECC blocks)) to a value of 0.9 (e.g., a ratio of nine blocks (i.e., host data blocks) to a combination of nine blocks (i.e., host data blocks) and one block (i.e., ECC block)). In some implementations, increasing the code rate may still provide a code rate smaller than its default value. For example, the memory device contains nine host data blocks, one default ECC block, and two extra ECC blocks, which has the value of the code rate as 9/12=0.75, then one extra ECC block is deleted or un-designated, leading to the code rate becoming 9/11=0.82, which is smaller than the default value 0.9.

Figure 3:
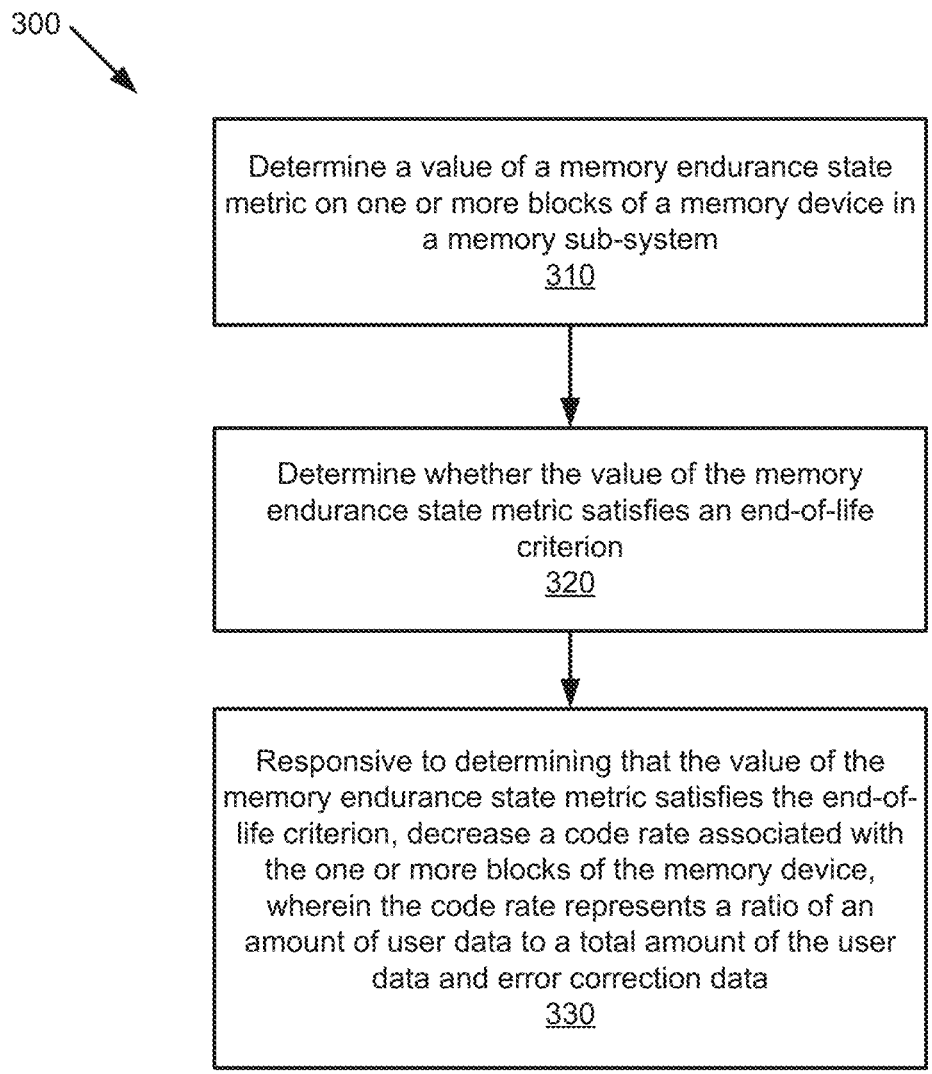
Figure 4:
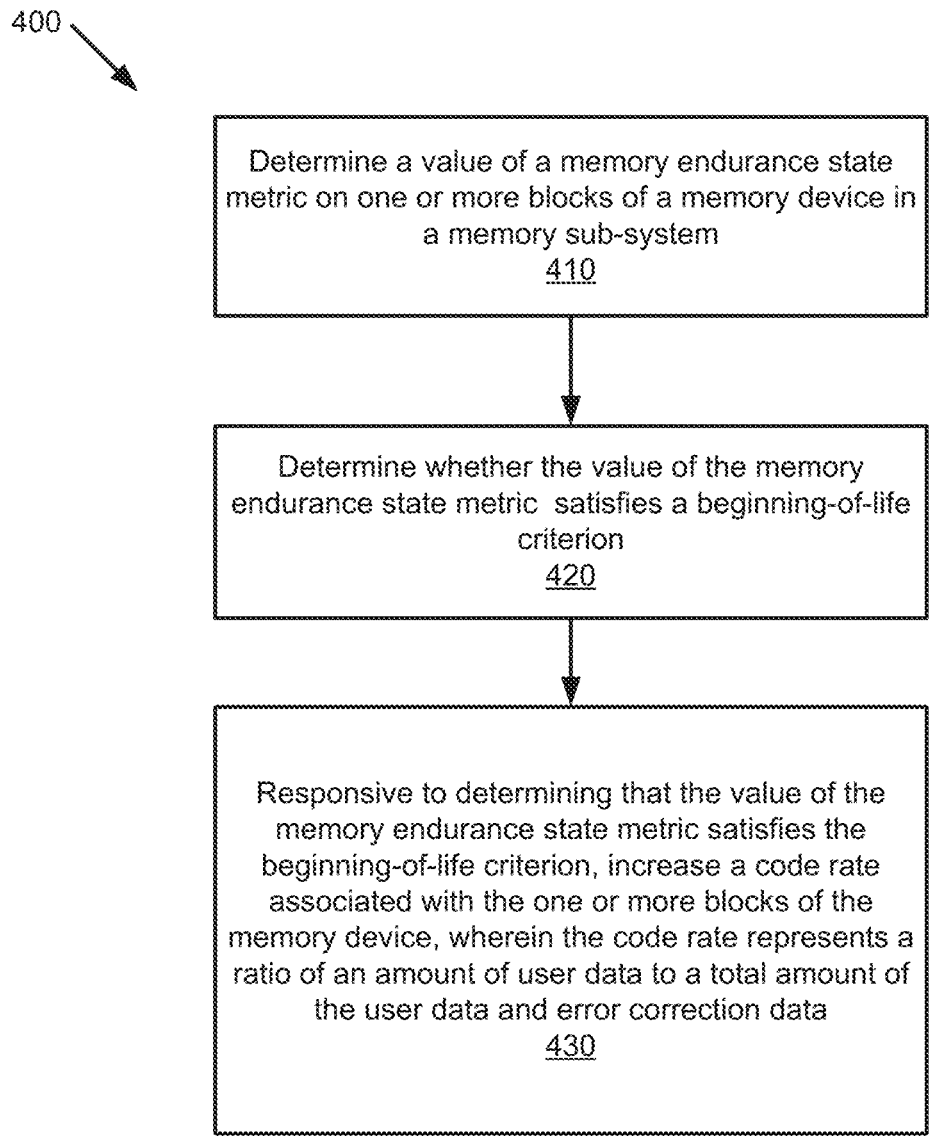
Figure 5:
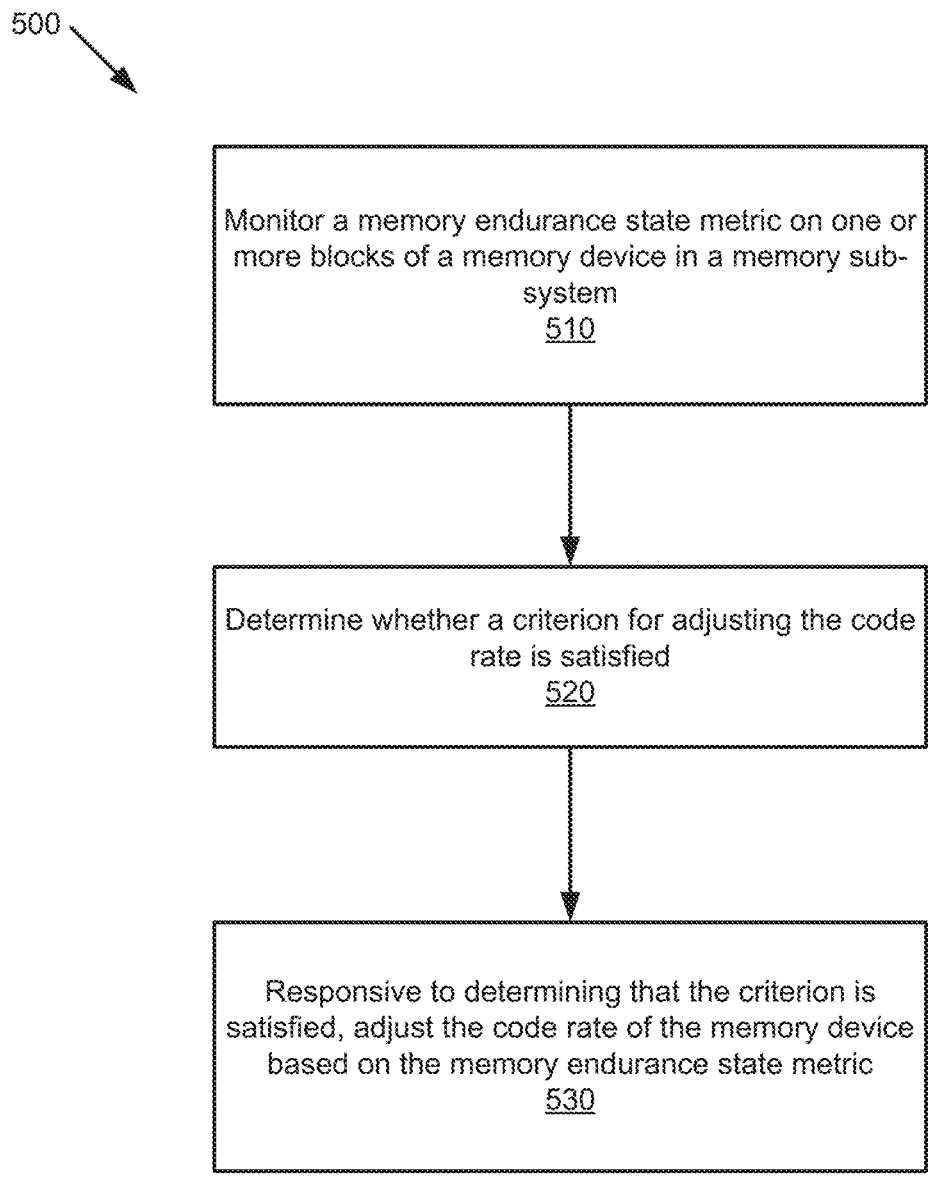

In some implementations, updating the code rate may be performed responsive to a determination to perform the code rate adjustment, including the end-of-life criterion, the beginning-of-life criterion, and/or the criterion for adjusting the code rate described with respect to FIGS. 3-5.

Referring to FIG. 3, at operation 310, the processing logic may determine a value of a memory endurance state metric on one or more blocks of a memory device in a memory sub-system, which may be same as or similar to operation 210.

At operation 320, the processing logic may determine whether the value of a memory endurance state metric satisfies an end-of-life criterion. For example, the processing logic may compare the value of the memory endurance state metric with the end-of-life criterion. In some implementations, the end-of-life criterion may be a threshold value related to end-of-life. For example, the processing logic may determine whether the P/E cycles count satisfies a threshold (e.g., greater than or equal to a threshold number of PE cycles) representing an estimated end of life. In another example, the processing logic may determine whether the total bytes written satisfies a threshold (e.g., greater than or equal to threshold total bytes written) representing an estimated end of life. In another example, the processing logic may determine whether the RBER value satisfies a threshold (e.g., greater than or equal to threshold RBER value) representing an estimated end of life.

At operation 330, responsive to determining that the value of the memory endurance state metric satisfies the end-of-life criterion, the processing logic may decrease the code rate associated with the one or more blocks of the memory device, which may be same as or similar to part of operation 230.

Referring to FIG. 4 at operation 410, the processing logic may determine a value of a memory endurance state metric on one or more blocks of a memory device in a memory sub-system, which may be same as or similar to operation 210.

At operation 420, the processing logic may determine whether the value of a memory endurance state metric satisfies a beginning-of-life criterion. For example, the processing logic may compare the value of the memory endurance state metric with the beginning-of-life criterion. In some implementations, the beginning-of-life criterion may be a threshold value related to end-of-life. For example, the processing logic may determine whether the P/E cycles count satisfies a threshold (e.g., smaller than or equal to a threshold number of PE cycles) representing an estimated beginning of life. In another example, the processing logic may determine whether the total bytes written satisfies a threshold (e.g., smaller than or equal to threshold total bytes written) representing an estimated beginning of life. In another example, the processing logic may determine whether the RBER value satisfies a threshold (e.g., smaller than or equal to threshold RBER value) representing an estimated beginning of life.

At operation 430, responsive to determining that the value of the memory endurance state metric satisfies the beginning-of-life criterion, the processing logic may increase the code rate associated with the one or more blocks of the memory device, which may be same as or similar to part of operation 230.

Referring to FIG. 5, at operation 510, the processing logic may monitor a memory endurance state metric on one or more blocks of a memory device in a memory sub-system. The processing logic may monitor the memory endurance state metric at pre-defined intervals, upon detecting occurrence of an event, or upon detecting a workload or environment change that exceeds a threshold. In some implementations, the processing logic may determine a value of the memory endurance state metric on one or more blocks of a memory device in a memory sub-system, which may be same as or similar to operation 210.

At operation 520, the processing logic may determine whether a criterion for adjusting the code rate is satisfied. In some implementations, the processing logic may use various criteria for adjusting the code rate. For example, the processing logic may determine to perform the code rate adjustment at every per-defined interval, and thus the criterion is satisfied at every pre-defined interval. In another example, the processing logic may determine to perform the code rate adjustment when a change to workload or environment over a threshold is detected, and thus the criterion is satisfied when an event or a change to workload or environment over a threshold is detected. In another example, the processing logic may determine whether the criterion for adjusting the code rate is satisfied by determining whether the memory endurance state metric satisfies an end-of-life or beginning-of-life criterion described above.

In some implementations, the adjust criterion can represent a system requirement for a minimum amount of valid blocks required to accommodate certain logical capacity for current workload or environment requirement. The memory endurance state metric satisfies the adjust criterion when the blocks used for error correction data is sufficient to the current workload or environment requirement and the blocks used for host data is maximized.

In some implementations, the adjust criterion may represent a requirement for a change of the code rate. For example, the adjust criterion may be a range of percentage values, and the processing logic may determine that the memory endurance state metric satisfies the adjust criterion when the percentage value of the memory endurance state metric falls in the range of the adjust criterion. In another example, the adjust criterion may include multiple ranges of percentage values, and the processing logic may determine that the memory endurance state metric satisfies the adjust criterion when the percentage value of the memory endurance state metric falls in any range of the adjust criterion.

In some implementations, the adjust criterion includes the beginning-of-life criterion, and the processing logic, in response, may increase a code rate associated with one or more blocks of a memory device, for example, to be maximum, regardless of the default value of the code rate. In some implementations, the adjust criterion includes the end-of-life criterion, and the processing logic, in response, may decrease a code rate associated with one or more blocks of a memory device, for example, to be minimum, regardless of the default value of the code rate.

At operation 530, responsive to determining that the criterion is satisfied, the processing logic may adjust the code rate of the memory device based on the memory endurance state metric, which may be same as or similar to operation 230.

FIGS. 6A and 6B are example illustrations of updating a code rate based on a memory endurance state metric in accordance with some embodiments of present disclosure. Referring to FIG. 6A, a graph of code rate and the P/E cycle is illustrated. Conventionally, a default code rate can be used throughout the life of the memory or memory segment, and assuming that a constant code rate is used from the beginning of life P0 to the legacy end of life P2, the total bytes written (TBW) for single level cells (SLC) would be the triangle area showed in FIG. 6A under line "SLC TBW before updating." TBW may refer to a sum of user bytes written per P/E cycle for the total numbers of P/E cycles. In some implementations of the present disclosure, the code rate for the beginning of life (e.g., the period between P0 to P1) is a constant value above the default value, the code rate for the middle of life (e.g., the period between P1 to P2) is a default constant value, and the code rate for beyond the end of life (e.g., the period between P2 to P3) is a constant value below the default value. "P3" represents the extended P/E cycles that a memory or memory segment can have. As such, the total bytes written (TBW) for single level cells (SLC) would be the triangle area showed in FIG. 6A under line "SLC TBW after updating," which is larger than the triangle area under line "SLC TBW before updating." This means that updating the code rate according to the present disclosure can extend the endurance of the memory device.

Referring to FIG. 6B, a look-up table providing the P/E cycles and corresponding code rate is illustrated. As the P/E cycles increase, the code rate decreases. For example, when the P/E cycles falls in the count of 0-V, the code rate is 0.9; when the P/E cycles falls in the count of V-W, the code rate is 0.8; when the P/E cycles falls in the count of W-X, the code rate is 0.7; when the P/E cycles falls in the count of X-Y, the code rate is 0.6; and when the P/E cycles falls in the count of Y-Z, the code rate is 0.5. As the code rate reduces, the system may have increased error correction capability, which may include increased hard correction capability (e.g., the capability of a hard decoder actually decodes) and increased soft correction capability (e.g., the capability of a soft decoder uses multiple bits to decode a larger RBER), leading to a faster performance.

It is noted that although a constant value is used for each period or ranges of P/E cycles in the examples of FIGS. 6A and 6B, the code rate can be variable and can dynamically change throughout each of the periods or ranges of P/E cycles. It is also noted that although three periods shown in FIG. 6A and five ranges of P/E cycles shown in FIG. 6B, the stages (e.g., the periods and the ranges of P/E cycles) can be as many as or as less as it fits.

Figure 7:
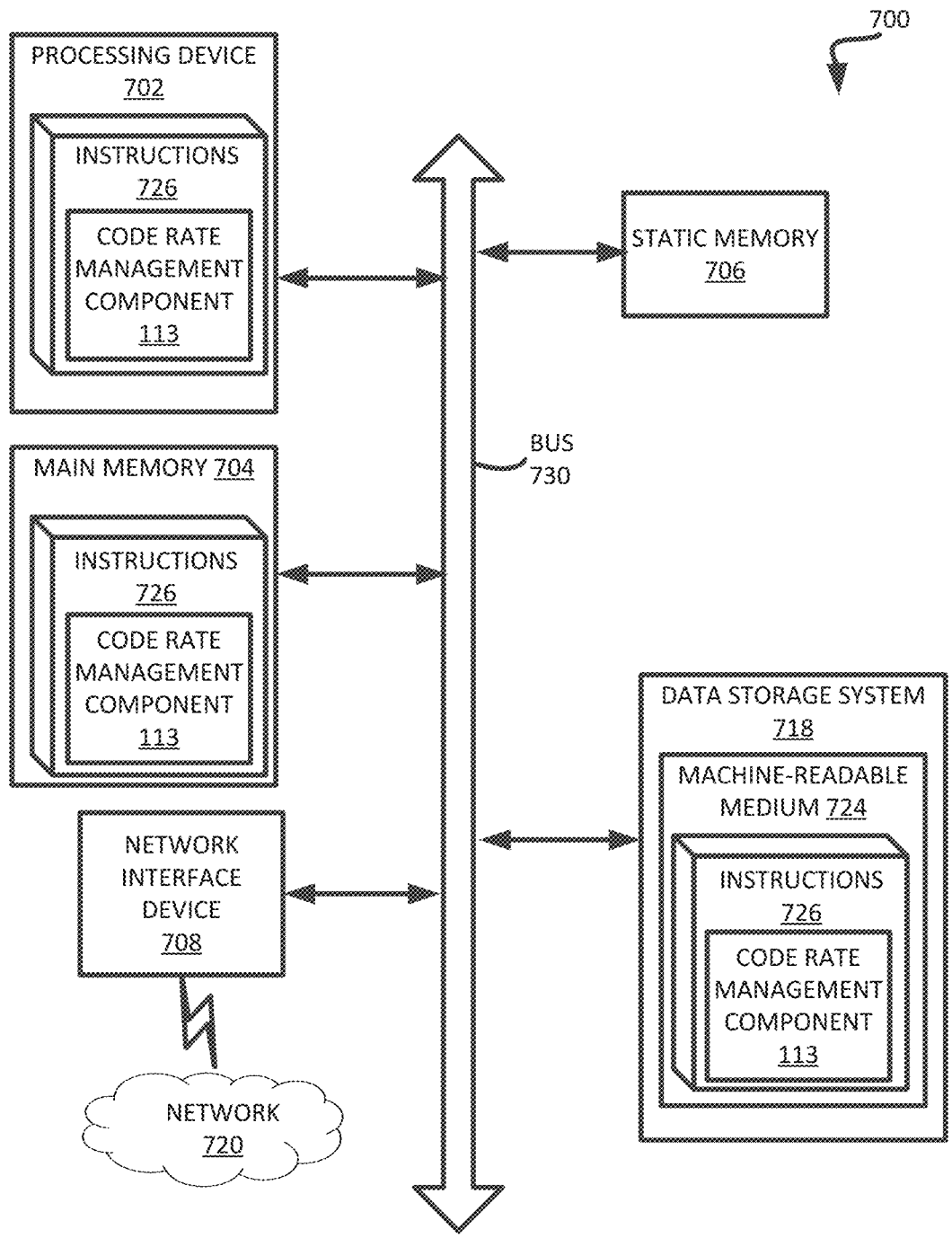
FIG. 7 is a block diagram of an example computer system in which implementations of the present disclosure can operate.

FIG. 7 illustrates an example machine of a computer system 700 within which a set of instructions, for causing the machine to perform any one or more of the methodologies discussed herein, can be executed. In some embodiments, the computer system 700 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the code rate management component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a data storage system 718, which communicate with each other via a bus 730.

Processing device 702 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 702 can also be one or more special-purpose processing devices such as an application specific integrated circuit (ASIC), a field programmable gate array (FPGA), a digital signal processor (DSP), network processor, or the like. The processing device 702 is configured to execute instructions 726 for performing the operations and steps discussed herein. The computer system 700 can further include a network interface device 708 to communicate over the network 720.

The data storage system 718 can include a machine-readable storage medium 724 (also known as a computer-readable medium) on which is stored one or more sets of instructions 726 or software embodying any one or more of the methodologies or functions described herein. The instructions 726 can also reside, completely or at least partially, within the main memory 704 and/or within the processing device 702 during execution thereof by the computer system 700, the main memory 704 and the processing device 702 also constituting machine-readable storage media. The machine-readable storage medium 724, data storage system 718, and/or main memory 704 can correspond to the memory sub-system 110 of FIG. 1.

In one embodiment, the instructions 726 include instructions to implement functionality corresponding to a data relocation component (e.g., the code rate management component 113 of FIG. 1). While the machine-readable storage medium 724 is shown For example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method comprising:
   determining, by a processing device, a target value of a code rate based on a value of a memory endurance state metric associated with a memory device in a memory sub-system; and
   adjusting the code rate of the memory device according to the target value, wherein the code rate reflects a ratio of a number of memory units designated for storing host-originated data to a total number of usable memory units.

2. The method of claim 1, wherein the memory endurance state metric reflects a count of program erase cycles.

3. The method of claim 1, wherein the memory endurance state metric reflects total bytes written and/or a raw bit error rate.

4. The method of claim 1,
   wherein the target value of the code rate is determined using a data structure comprising a plurality of records, wherein each record of the plurality of records maps a specific value of a code rate to a corresponding value of the memory endurance state metric.

5. The method of claim 1,
   wherein the target value of the code rate is determined according to sample data associated with a specified management unit of the memory device, wherein the sample data provides a plurality of records, wherein each record of the plurality of records maps a specific value of a code rate corresponding to a value of the memory endurance state metric.

6. The method of claim 5, wherein the specified management unit comprises a sacrificial block, and wherein the sacrificial block is programed or erased at a rate faster than blocks designated for user data to provide the plurality of records.

7. The method of claim 1, wherein adjusting the code rate further comprises:
   increasing a number of memory units used to store the host-originated data and decreasing a number of blocks used to store error correction metadata in order to increase the code rate.

8. The method of claim 1, wherein adjusting the code rate further comprises:
   decreasing a number of memory units used to store the host-originated data and increasing a number of blocks used to store error correction metadata in order to decrease the code rate.

9. The method of claim 1, wherein adjusting the code rate further comprises:
   increasing a number of memory units used to store error correction metadata while keeping a number of blocks used to store the host-originated data unchanged in order to decrease the code rate.

10. The method of claim 1, wherein adjusting the code rate further comprises:
    decreasing a number of memory units used to store error correction metadata while keeping a number of blocks used to store the host-originated data unchanged in order to increase the code rate.

11. The method of claim 1, wherein adjusting the code rate further comprises:
    responsive to determining that the value of the memory endurance state metric exceeds an end-of-life threshold, decreasing the code rate below a predefined threshold code rate.

12. The method of claim 1, wherein adjusting the code rate further comprises:
    responsive to determining that the value of the memory endurance state metric does not exceed a beginning-of-life threshold, increasing the code rate above a predefined threshold code rate.

13. The method of claim 1, wherein adjusting the code rate further comprises:
    responsive to determining that the value of the memory endurance state metric falls in a range, using a predefined code rate as the code rate.

14. A system comprising:
    a memory device; and
    a processing device, operatively coupled with the memory device, to perform operations comprising:
        determining a target value of a code rate based on a value of a memory endurance state metric associated with the memory device; and
        adjusting the code rate of the memory device according to the target value, wherein the code rate reflects a ratio of a number of memory units designated for storing host-originated data to a total number of usable memory units.

15. The system of claim 14, wherein the memory endurance state metric reflects a count of program erase cycles.

16. The system of claim 14, wherein the target value of the code rate is determined according to a data structure comprising a plurality of records, wherein each record of the plurality of records maps a specific value of a code rate to a corresponding value of the memory endurance state metric.

17. The system of claim 14, wherein the target value of the code rate is determined according to sample data associated with a specified management unit of the memory device, wherein the sample data provides a plurality of records, and wherein each record of the plurality of records maps a specific value of a code rate corresponding to a value of the memory endurance state metric, and wherein adjusting the code rate based on the value of the memory endurance state metric is performed according to the target value.

18. A non-transitory computer-readable storage medium comprising instructions that, when executed by a processing device, cause the processing device to perform operations, comprising:
    determining a target value of a code rate based on a value of a memory endurance state metric associated with a memory device; and
    adjusting the code rate of the memory device according to the target value, wherein the code rate reflects a ratio of a number of memory units designated for storing host-originated data to a total number of usable memory units.

19. The non-transitory computer-readable storage medium of claim 18, wherein the target value of the code rate is determined according to a data structure comprising a plurality of records, wherein each record of the plurality of records maps a specific value of a code rate to a corresponding value of the memory endurance state metric.

20. The non-transitory computer-readable storage medium of claim 18, wherein the target value of the code rate is determined according to sample data associated with a specified management unit of the memory device, wherein the sample data provides a plurality of records, wherein each record of the plurality of records maps a specific value of a code rate corresponding to a value of the memory endurance state metric.

* * * * *